United States Patent [19]
Endo et al.

[11] Patent Number: 6,110,732
[45] Date of Patent: Aug. 29, 2000

[54] GARBAGE DISPOSAL APPARATUS

[76] Inventors: Iwao Endo; Hiroyasu Endo, both of 76, Nabekura, Ohaza-Kitazawaaza, Sakata-shi, Yamagata, Japan

[21] Appl. No.: 09/254,904
[22] PCT Filed: Mar. 26, 1998
[86] PCT No.: PCT/JP98/01369
  § 371 Date: Jun. 21, 1999
  § 102(e) Date: Jun. 21, 1999
[51] Int. Cl.[7] .................................................. C12M 1/02
[52] U.S. Cl. ..................................... 435/290.2; 435/290.1
[58] Field of Search .............................. 435/290.1, 290.2

[56] References Cited

U.S. PATENT DOCUMENTS 4,676,380  6/1987  Dahlby ..................................... 209/616

FOREIGN PATENT DOCUMENTS

| | | |
|---|---|---|
| 62-191106 | 8/1987 | Japan . |
| 6-316477 | 11/1994 | Japan . |
| 820999 | 9/1959 | United Kingdom ................ 435/290.3 |

*Primary Examiner*—David A. Redding
*Attorney, Agent, or Firm*—Jones & Askew, LLP

[57] ABSTRACT

There is described a garbage disposal apparatus including a storage drum for storing garbage and having a meshed bottom, and an agitation and mixing mechanism disposed within the storage drum, the agitation and mixing mechanism stirring and mixing together garbage and microorganism-carrying carriers, and the garbage being fermented and decomposed, wherein a water-spraying mechanism is disposed beneath the meshed bottom of the storage drum and squirts water to the meshed bottom from outside of the storage drum.

8 Claims, 6 Drawing Sheets

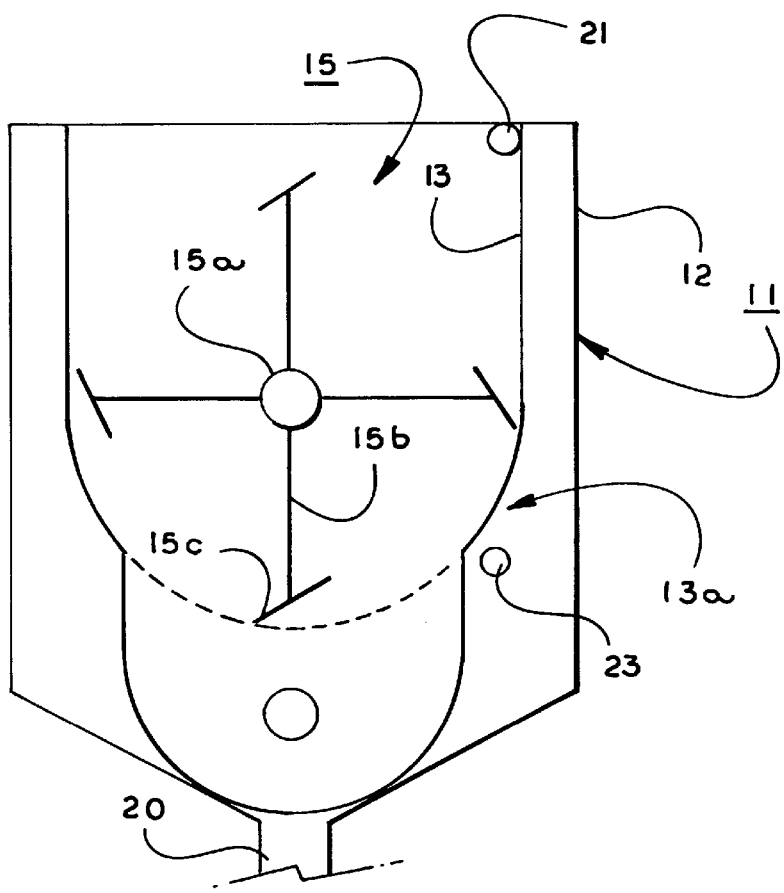
Fig_1A
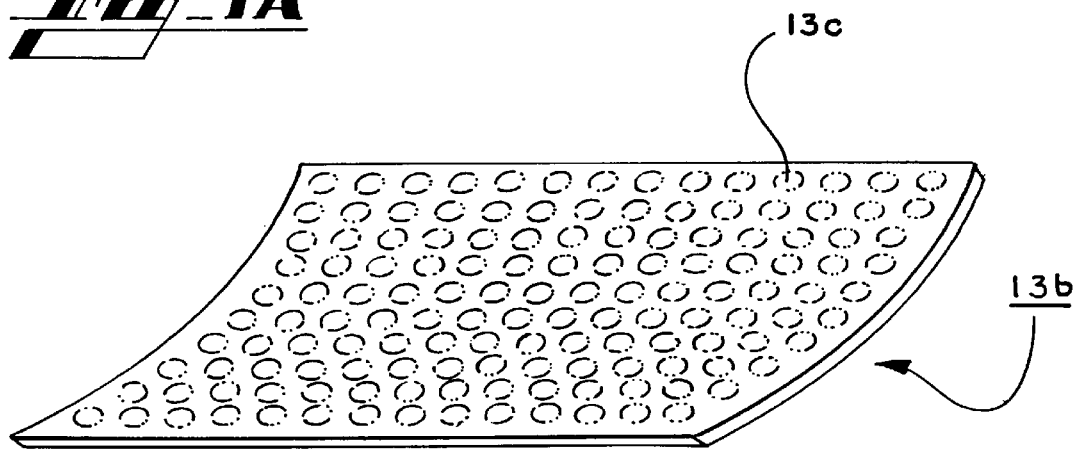
Fig_2

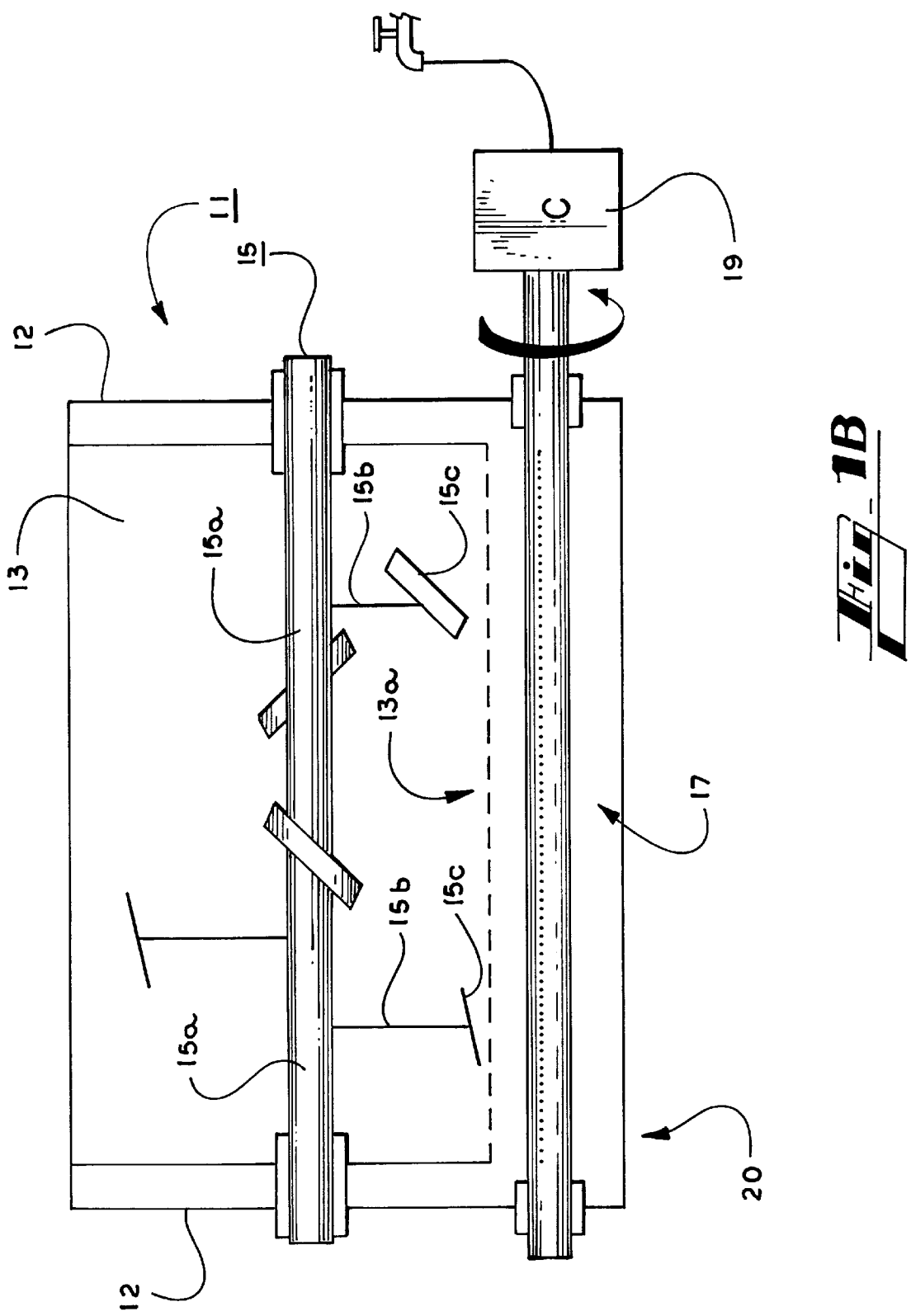

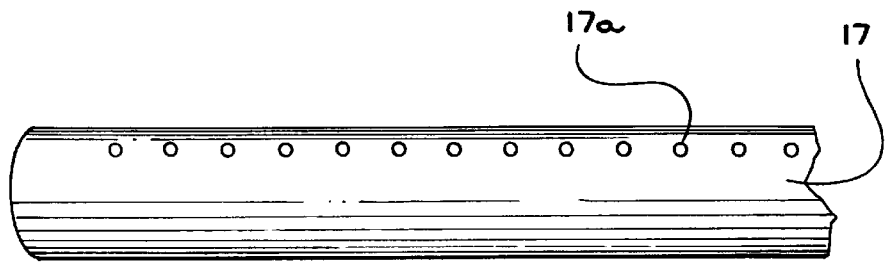
*Fig_3A*
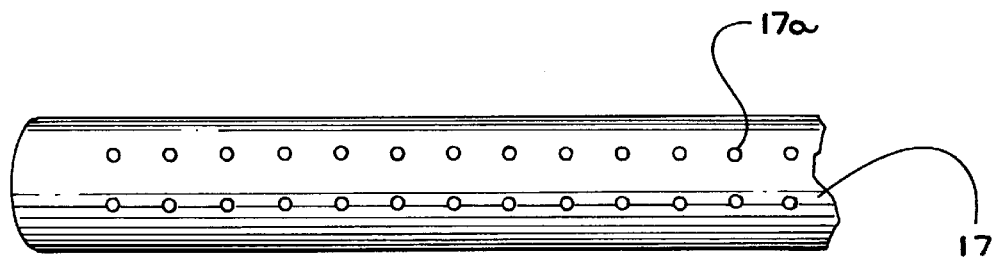
*Fig_3B*
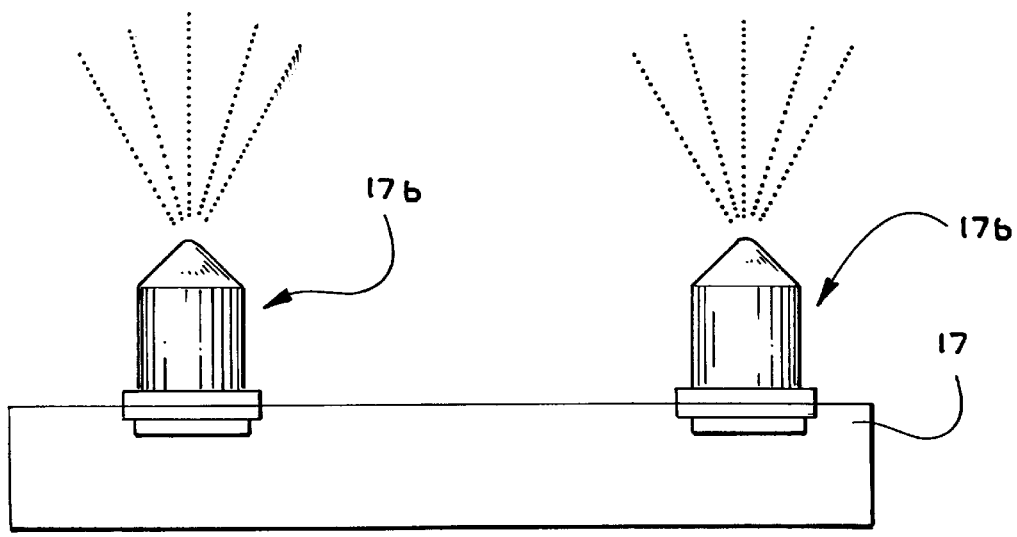
*Fig_3C*

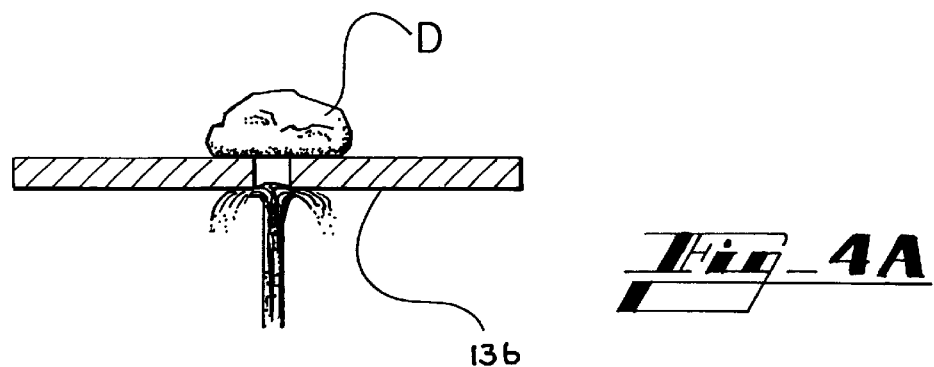
Fig_4A
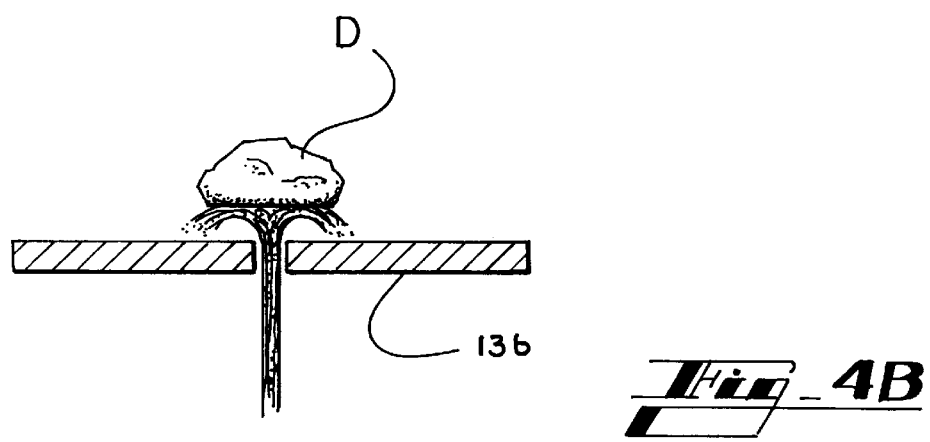
Fig_4B
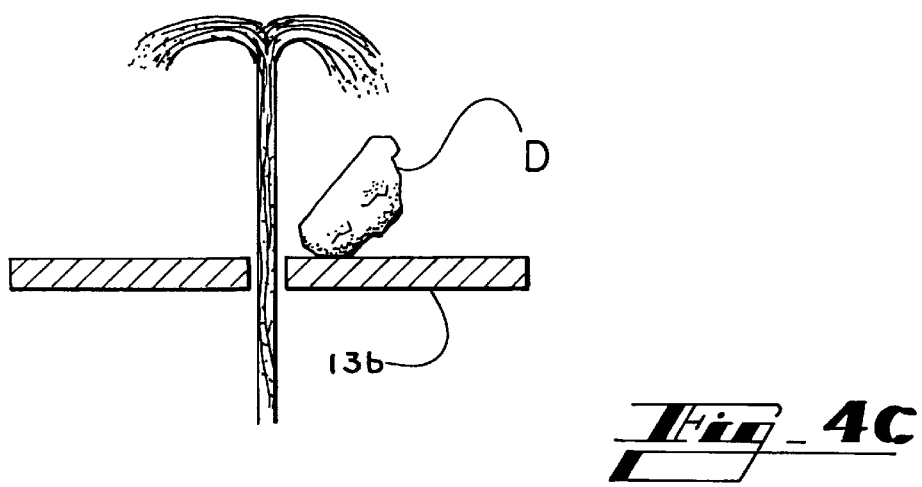
Fig_4C

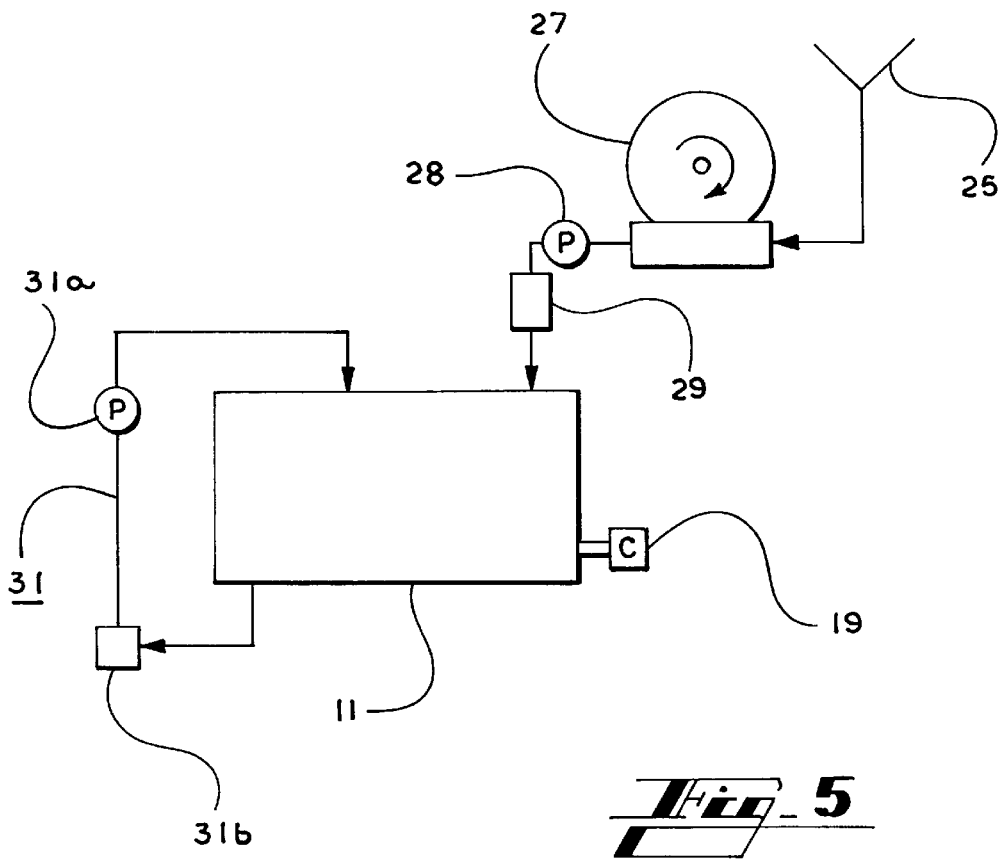
_Fig_5
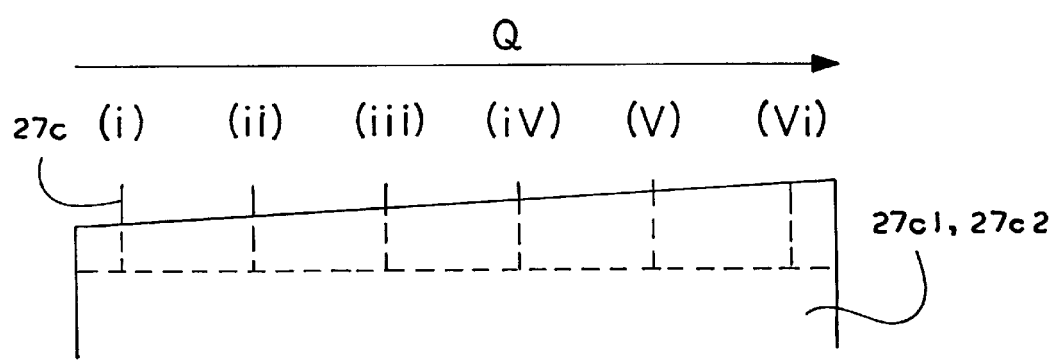
_Fig_7

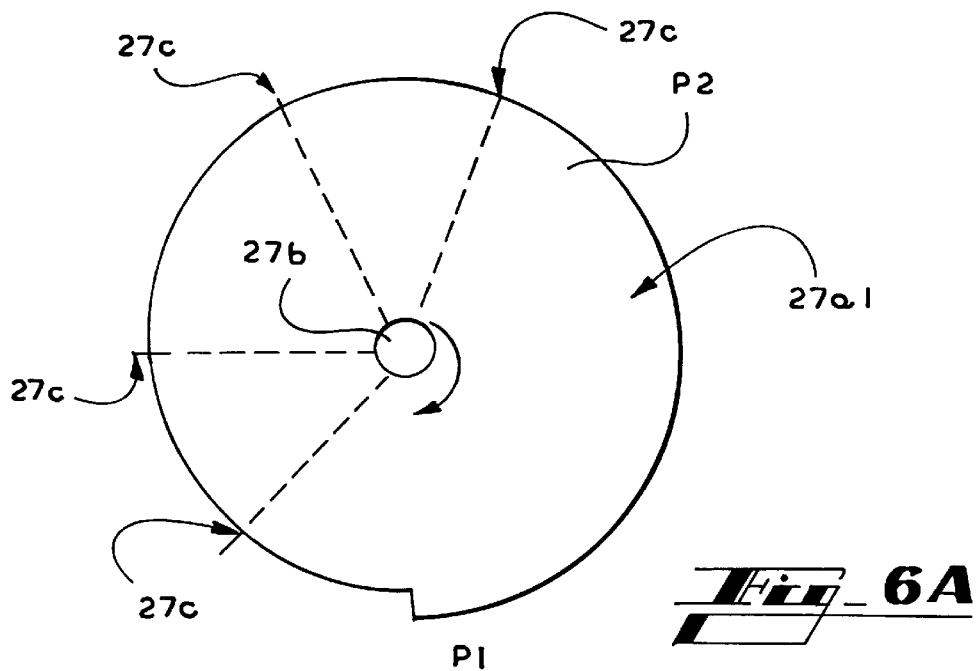
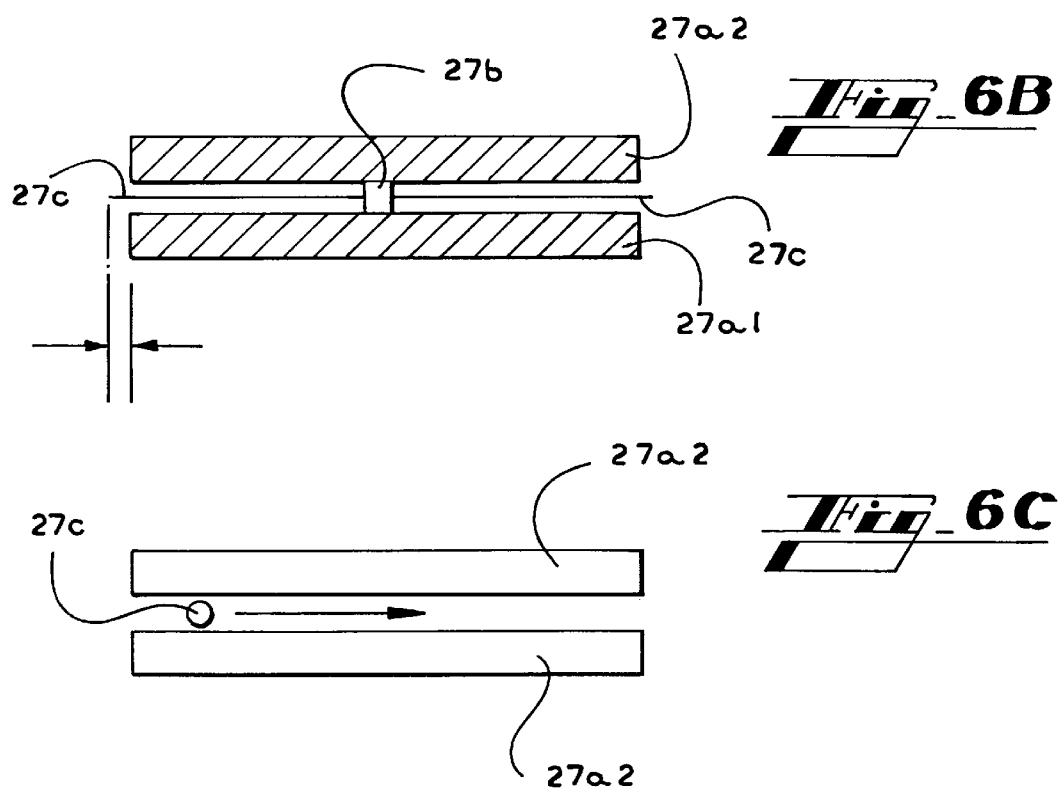

GARBAGE DISPOSAL APPARATUS

BACKGROUND OF THE INVENTION

1. Field of the Invention

The present invention relates to a garbage disposal apparatus for disposing of garbage by action of microorganisms, and more particularly, to a garbage disposal apparatus designed so as to completely decompose garbage by action of microorganisms.

2. Description of the Background Art

Garbage has conventionally been disposed of through incineration and land reclamation, but the disposal methods have limitations. A surge in the generation of garbage associated with population growth and ever-increasing consumption makes garbage problems more serious. This tendency has become a global phenomenon, and hence solution of the garbage problem assumes great social significance.

Many inventions have already been made to solve the garbage problem, and the majority of the inventions are directed toward composting of garbage through utilization of microorganisms. However, composts are useless for those who have no way to use the composts, such as inhabitants in urban areas. Further, even when there are people who need composts, if garbage is generated in amounts greater than in normal times, disposal of garbage cannot keep up with generation of the same. Thus, since garbage cannot be disposed of when desired, the foregoing inventions cannot completely solve the garbage problem over the long run.

In the light of such a problem, the present inventor has conceived an invention related to a garbage disposal apparatus which completely decomposes garbage into carbon dioxide and water through action of microorganisms (Japanese Patent Application Laid-open Nos. 7-68240 and 8-108166). In this apparatus, primarily, carriers carrying aerobic microorganisms and garbage are mixed within a garbage processing drum through agitation under aerobic conditions. Water supply to and temperature control of the drum are carried out, as necessary, thereby completely decomposing the garbage fed into the drum into water and carbon dioxide. This garbage disposal apparatus enables complete decomposition of garbage by only periodic replenishment of microorganism-carrying carriers and intermittent agitation. For this reason, this invention can address generation of garbage, which increases year by year. Further, garbage is completely decomposed into carbon dioxide and water, and hence the water can be flushed down an ordinary drain. The present invention has an advantage of eliminating necessity for a special facility other than the disposal apparatus itself. Therefore, the garbage disposal apparatus can be installed at limited sites such as urban areas.

SUMMARY OF THE INVENTION

The object of the present invention is to improve disposal efficiency and usefulness of an existing garbage disposal apparatus which completely decomposes garbage into carbon dioxide and water through action of microorganisms, by making improvements to the garbage disposal apparatus.

As a result of considerable studies conducted for the purpose of accomplishing the foregoing object, the present inventor found that water and a certain amount of air are supplied to microorganisms by addition of water to a lower portion of a garbage processing drum in which microorganisms are active, from beneath as well as from above, thereby accelerating decomposition of garbage by microorganisms. Thus, the inventor has completed the present invention.

The present invention provides a garbage disposal apparatus including a storage drum for storing garbage and having a meshed bottom, and an agitation and mixing mechanism disposed within the storage drum, the agitation and mixing mechanism stirring and mixing together garbage and microorganism-carrying carriers, and the garbage being fermented and completely decomposed, wherein a water-spraying mechanism is disposed beneath the meshed bottom of the storage drum and sprays water onto the meshed bottom from outside of the storage drum.

The present invention provides the garbage disposal apparatus, wherein the agitation and mixing mechanism comprises a rotary shaft disposed in parallel with the meshed bottom; agitation arms which are mounted on the rotary shaft and are rotated in the circumferential direction of the rotary shaft in association with rotation of the rotary shaft; and mixing plates attached to the leading edges of the individual agitation arms.

The present invention provides the garbage disposal apparatus, wherein the meshed bottom is curved along a path on which the mixing plates travel.

The present invention provides the garbage disposal apparatus, wherein the water-spraying mechanism comprises a water-spraying pipe having water-spraying holes formed therein; a rotor which rotates the water-spraying pipe; a water supply apparatus for supplying water to the water-spraying pipe; and a controller for regulating the volume and pressure of the water supplied by the water supply apparatus.

The present invention provides the garbage disposal apparatus, wherein water is sprayed from the outside of the storage drum with such a force as to lift, to a certain extent, garbage remaining on the meshed bottom.

The present invention provides the garbage disposal apparatus, further comprising a loop mechanism for guiding liquid sewage drained out of the garbage disposal apparatus to the storage drum once again.

The present invention provides the garbage disposal apparatus, further comprising a plastic container removal device for removing plastic containers included in garbage, wherein the plastic container removal device comprises spoke members for catching plastic containers; and a recess in which the spoke members pass in a predetermined single direction and which houses the spoke members in an increasing proportion as the spoke members proceed in the predetermined single direction, wherein plastic containers are removed from garbage through a series of operations, that is, catching of plastic containers by the spoke members through movement thereof in the single direction, and release of the plastic containers from the spoke members as the spoke members enter the recess while moving in the single direction.

The present invention provides the garbage disposal apparatus, wherein the plastic container removal apparatus comprises a rotary shaft on which the spoke members are mounted; a pair of housings which face each other with the rotary shaft therebetween; the recess which is formed in the space between the pair of housings and serves as a path along which the spoke members pass, wherein the periphery of each of the pair of housings is set such that the spoke members enter the recess in association with their movement.

Throughout the specification and appended claims, a term "plastic container" designates a general container formed from a polymer substance, such as polyvinyl chloride or polypropyrene, and broadly encompasses so-called vinyl bags and containers ranging from soft vinyl products to vinyl products having a certain degree of hardness.

BRIEF DESCRIPTION OF THE DRAWINGS

FIGS. 1(A) and 1(B) are views for describing the function and structure of a garbage disposal apparatus according to the present invention, wherein FIG. 1(A) is a cross-sectional view taken along a rotary shaft of a mixer, and FIG. 1(B) is a cross-sectional view taken along a direction perpendicular to the rotary shaft of the mixer;

FIG. 2 is an enlarged view showing a portion of a meshed bottom of the garbage disposal apparatus according to the present invention;

FIGS. 3(A) to 3(C) are enlarged partial views showing the structure of a water-spraying pipe, wherein FIG. 3(A) is a partial side view, FIG. 3(b) is a partial top view, and FIG. 3(c) shows a water-spraying pipe according to another embodiment of the present invention;

Figs, 4(A) to 4(C) are schematic representations for describing the power of a water jet sprayed from a water-spraying hole of the water-spraying pipe of the garbage disposal apparatus;

FIG. 5 is a schematic representation showing a garbage disposal system which employs the garbage disposal apparatus according to the present invention;

FIGS. 6(A) to 6(C) are schematic representations showing the functional structure of a plastic container removal device according to the present invention, wherein FIG. 6(A) is a front view, FIG. 6(B) is a cross-sectional view, and FIG. 6(C) is a top view; and FIG. 7 is a plot for describing the principle of the plastic container removal device according to the present invention.

BEST MODE FOR WORKING THE PRESENT INVENTION

FIGS. 1(A) and 1(B) are views for describing the function and structure of a garbage disposal apparatus according to the present invention, wherein FIG. 1(A) is a cross-sectional view taken along a rotary shaft of a mixer, and FIG. 1(B) is a cross-sectional view taken along a direction perpendicular to the rotary shaft of the mixer.

As shown in FIGS. 1(A) and 1(B), a garbage disposal apparatus 11 according to the present invention comprises a casing 12 and a storage drum 13 which is provided in the casing 12 and stores garbage and microorganism carriers. The storage drum 13 is equipped with a mixer 15 for mixing and stirring the garbage and microorganism carriers stored in the storage drum 13 and has a meshed bottom 13a. In the first embodiment, as shown in FIG. 2 which is a partial enlarged view of the meshed bottom, the meshed bottom 13a is formed from a perforated stainless plate 13b. Perforations 13c of the stainless plate 13b are of such a size as to prevent passage of garbage and microorganism carriers. The internal diameter of the perforations 13c is usually set to a relevant value within a range from 0.5 to 2.0 mm or thereabouts.

In the first embodiment, the mixer (an agitation and mixing mechanism) 15 comprises a rotary shaft 15a, agitation arms 15b attached to the rotary shaft 15a, and mixing plates 15c attached to the respective ends of the agitation arms 15b. The agitation arms 15b are actuated in association with rotation of the rotary shaft 15a, thereby stirring and mixing garbage and microorganism carriers. As shown in FIG. 1(A), the meshed bottom 13a is formed so as to have a hemispherical cross section to thereby permit circular rotation of the mixing plates 15c together with rotation of the rotary shaft 15a. Since the mixing plates 15c are formed so as to travel in close proximity to the surface of the meshed bottom 13a, so that the garbage and the microorganism carriers remaining on the surface of the meshed bottom 13a are agitated every time the mixing plates 15c move. Thus, garbage and microorganism carriers can be prevented from remaining at the bottom of the storage drum 13 and can be completely agitated. Preferably, the agitation arms 15b are mounted on the rotary shaft 15a at predetermined intervals in a helical fashion pattern. Further, the mixing plates 15c are tilt so that garbage and microorganism carriers are directed in a predetermined direction for the purpose of collection. As a result, as in the case of rotation of a drill, garbage and microorganism carriers can be moved in the axial direction of the rotary shaft 15a.

In the garbage disposal apparatus according to the present invention, a water-spraying pipe 17 is disposed beneath the meshed bottom 13a. As shown in FIGS. 3(A) to 3(C), water-spraying holes 17a are formed in the water-spraying pipe 17, and the water supplied to the water-spraying pipe 17 is sprayed from the water-spraying holes 17a. The thus-sprayed water is jetted toward the meshed bottom 13a from beneath.

As shown in FIGS. 4(A) to 4(C), water may be sprayed with several degrees of force. As shown in FIG. 4(A), water may be sprayed with such a weak force as to leave stationary microorganism carriers per se or garbage D including microorganism carriers. As shown in FIG. 4(B), water may be sprayed with such a force as to lift from the meshed bottom 13a microorganism carriers per se or the garbage D including microorganism carriers. As shown in FIG. 4(C), water may be sprayed with such a force as not only to lift from the meshed bottom 13a microorganism carriers per se or the garbage D including microorganism carriers but also to turn over the microorganism carriers or the garbage D. The spraying of water as shown in FIG. 4(B) is desirable for achieving the object of the present invention. By setting the force with which water is sprayed to such a value, water and oxygen can be fed to the storage drum 13, thereby rendering the activities of microorganisms active.

The water-spraying force may be controlled by regulation of pressure and volume of the water supplied to the water-spraying pipe 17 from the water supply, through use of a controller 19 shown in FIG. 5. Further, the perforations 13c of the stainless plate 13b may be prevented from becoming clogged, by increasing the force with which water is sprayed [e.g., to a spraying force equal to or greater than that shown in FIG. 4(C)]. Further, the outer surface of the meshed bottom 13a may be readily cleansed by reducing spraying force [e.g., to a spraying force equal to or less than that shown in FIG. 4(A)]. In the case of cleansing the meshed bottom 13a, the spraying force may be controlled according to the degree of grime. The more heavy the grime, the stronger the spraying force.

According to the first embodiment, as is evident from FIG. 3(A), which is a partial side view and FIG. 3(B), which is a partial top view, the water-spraying holes 17a are formed in two rows in the water-spraying pipe 17, and the water-spraying pipe 17 is pivotally actuated such that sprayed water moves back and forth over the bottom surface of the meshed bottom 13a. As a result, water can be sprayed over the entire surface of the meshed bottom 13a. The water-spraying holes 17a may be formed into three ore more rows so as to be able to spray water over the entire surface of the meshed bottom 13a without use of other measures. Further, the water-spraying pipe 17 may be swung slightly, as necessary. Alternatively, sprinklers 17b may be provided on the water-spraying pipe 17 so as to spray water toward the meshed bottom 13a. In the case of the sprinklers 17b being provided on the water-spraying pipe 17, variations in spraying force due to a drop in the pressure of water supplied to the water-spraying pipe 17 may be reduced further than in the case of the water-spraying holes 17a being formed in the water-spraying pipe 17.

In the present embodiment, the controller 19 also controls rotational or pivotal movement of the water-spraying pipe 17, as in the case of the pressure and volume of water supplied to the water-spraying pipe 17. As in the case of the number of rows of water-spraying holes 17a, the number of water-spraying holes 17a is arbitrarily set according to the state of use of the garbage disposal apparatus, as required. Water resulting from decomposition of garbage and water squirted from the water-spraying pipe 17 is drained out by way of a drain pipe 20. Preferably, more than one drain pipe 20 is provided.

In addition to the previously-described constituent elements, the garbage disposal apparatus 11 according to the present invention is provided with a sprinkling pipe 21 which replenishes water as required, and a heater 23 for heating water when necessary, thereby realizing surroundings optimum for microorganisms to be active. Aerobic bacterium commonly used for inventions of this type may be employed as microorganisms. Further, wood chips or sawdust commonly used for inventions of this type (e.g., Japanese Patent Application Laid-open Nos. 7-163968, 8-173934, and 8-281245) may be employed as microorganism carriers.

In order to dispose of garbage, garbage is desirably milled beforehand to a certain extent. Further, if garbage is contained in a plastic container, the plastic container must be removed in advance.

In a garbage disposal system shown in FIG. 5, garbage fed into a hopper 25 is conveyed by way of a plastic container removal device 27 and is milled by a disposer 29, as required. Subsequently, the garbage is transferred to the garbage disposal apparatus 11 according to the present invention. Garbage is conveyed by means of a transfer force of a pump 28, thereby preventing a plastic container from entering the garbage disposal apparatus 11. Simultaneously, pre-milling of garbage renders garbage disposal efficient.

The garbage disposal system has a loop 31 for returning liquid sewage generated in the garbage disposal apparatus 11 thereto by means of a pump 31a. If the liquid sewage must be collected in a predetermined volume, the liquid sewage may be temporarily stored in a storage tank 31b. By means of this loop, even if liquid sewage is incompletely decomposed, the liquid sewage may be disposed of once again, thus enabling achievement of an allowable chemical oxygen demand (COD) or a biochemical oxygen demand (BOD) which enables the liquid sewage to be drained out to the surroundings without causing destruction of the environment. If necessary, a sensor may be disposed in the storage tank 31b to thereby monitor liquid sewage. When necessary, the liquid sewage may be decomposed again by activation of the loop 31.

FIGS. 6(A) to 6(C) are block diagrams showing the functional structure of the plastic removal device 27 according to the present invention. FIG. 6(A) is a front view showing the plastic removal device 27; FIG. 6(B) is a cross-sectional view of the same; and FIG. 6(C) is a top view of the same. FIG. 7 is a schematic representation for describing the principle of the plastic container removal device 27 according to the present invention.

The plastic container removal device 27 according to the present invention comprises two housings 27a1 and 27a2, a rotary shaft 27b interposed therebetween, and spoke members 27c radially extend from the rotary shaft 27b. The leading edge of each spoke member 27c is formed into a hook or claw so as to be able to catch a plastic container. In the present embodiment, the two housings 27a1 and 27a2 are not perfectly circular but are set so that the diameter lengthens stepwise along a path from point P1 to point P2 shown in FIG. 6(A). Therefore, as the spoke members 27c rotate, the portions of the leading edges of the spoke members 27c that protrude from the outer periphery of the housings 27a1 and 27a2 vary in length. More specifically, as the spoke members 27c travel from point P1 to point P2, the leading edges of the spoke members 27c gradually enter the housings. During the course of rotation from point P2 to point P1, the spoke members 27c are rotated while remaining completely hidden but come out from the outer periphery of the housings when they come to point P1.

The principle on the basis of which the plastic container removal device 27 according to the present invention removes a plastic container will now be described. As shown in FIG. 7, the radii of the housings 27a1 and 27a2 increase gradually, and hence as the spoke members 27c of given length are rotated in a rotation direction Q thereof [i.e., in the direction from point (i) to point (vi) shown in FIG. 7], the proportion by which the spoke members 27c enter the housings 27a1 and 27a2 increases. Finally, the spoke members 27c become completely hidden in the housings 27a1 and 27a2 [at point (vi) shown in FIG. 7]. The plastic container that is caught by the spoke member 27c while its leading edge is protruding from the housings 27a1 and 27a2 is released from the spoke member 27c as a result of the spoke member 27c entering the housings 27a1 and 27a2. As a result, the plastic container is dislodged from the spoke member 27c through rotation thereof. As a matter of course, while the leading edges of the spoke members 27c are protruding from the housings 27a1 and 27a2, the leading edges can catch plastic containers. During the course of rotation of the spoke members 27c from point (i) to point (iii), the spoke members 27c catch plastic containers. In contrast, during the course of rotation of the spoke members 27c from point (iv) to (vi), the plastic containers are released. Eventually, through mere rotation of the spoke members 27c in rotation direction D, consecutive operations "catching of a plastic container" and "release of the plastic container" are effected.

Since the housings 27a1 and 27a2 are set such that their radii gradually increase from point P1 to point P2, the proportion in which the spoke member 27c enters the housings 27a1 and 27a2 increases as the spoke member 27c is rotated from point P1 to point P2. At point P2, the spoke member 27c completely enters the housings 27a1 and 27a2. In the plastic container removal device 27, rotation of the spoke member 27c enables catching of another plastic container after release of a plastic container. Thus, as a result of rotation of the spoke members 27c within the housings 27a1 and 27a2, operations such as "catching of a plastic container," "release of the plastic container," and "catching of another plastic container" are automatically and cyclically effected.

As has been described above, use of a garbage disposal apparatus according to the present invention enables improvement in processing efficiency and usefulness of an existing garbage processing system.

What is claimed is:

1. A garbage disposal apparatus including a storage drum for storing garbage and having a meshed bottom, and an agitation and mixing mechanism disposed within the storage drum, the agitation and mixing mechanism stirring and mixing together garbage and microorganism-carrying carriers, and the garbage being fermented and decomposed, wherein a water-spraying mechanism is disposed beneath the meshed bottom of the storage drum and sprays water onto the meshed bottom from outside of the storage drum.

2. The garbage disposal apparatus as defined in claim 1, wherein the agitation and mixing mechanism comprises:

a rotary shaft disposed in parallel with the meshed bottom;

agitation arms which are mounted on the rotary shaft and are rotated in the circumferential direction of the rotary shaft in association with rotation of the rotary shaft; and mixing plates attached to the leading edges of the individual agitation arms.

3. The garbage disposal apparatus as defined in claim 2, wherein the meshed bottom is curved along a path on which the mixing plates travel.

4. The garbage disposal apparatus as defined in claim 1, wherein the water-spraying mechanism comprises:

a water-spraying pipe having water-spraying holes formed therein;

a rotor which rotates the water-spraying pipe;

a water supply apparatus for supplying water to the water-spraying pipe; and a controller for regulating the volume and pressure of the water supplied by the water supply apparatus.

5. The garbage disposal apparatus as defined in claim 1, wherein water is sprayed from the outside of the storage drum with such a force as to lift, to a certain extent, garbage remaining on the meshed bottom.

6. The garbage disposal apparatus as defined in claim 1, further comprising a loop mechanism for guiding liquid sewage drained out of the garbage disposal apparatus to the storage drum once again.

7. The garbage disposal apparatus as defined in claim 1, further comprising a plastic container removal device for removing plastic containers included in garbage, wherein the plastic container removal device comprises:

spoke members for catching plastic containers; and a recess in which the spoke members pass in a predetermined single direction and which houses the spoke members in an increasing proportion as the spoke members proceed in the predetermined single direction, wherein plastic containers are removed from garbage through a series of operations, that is, catching of plastic containers by the spoke members through movement thereof in the single direction, and release of the plastic containers from the spoke members as the spoke members enter the recess while moving in the single direction.

8. The garbage disposal apparatus as defined in claim 7, wherein the plastic container removal apparatus comprises:

a rotary shaft on which the spoke members are mounted;

a pair of housings which face each other with the rotary shaft therebetween;

the recess which is formed in the space between the pair of housings and serves as a path along which the spoke members pass, wherein the periphery of each of the pair of housings is set such that the spoke members enter the recess in association with their movement.

* * * * *